(12) United States Patent
Pavon et al.

(10) Patent No.: US 6,394,017 B2
(45) Date of Patent: May 28, 2002

(54) CRAFT TRANSPORTABLE BY ROAD

(76) Inventors: Salvador Pavon, 4, rue de l'église, F-06600 Antibes; Christophe Pavon, Quartier "Les Granges", F-06140 Coursegoules, both of (FR)

( * ) Notice: Subject to any disclaimer, the term of this patent is extended or adjusted under 35 U.S.C. 154(b) by 0 days.

(21) Appl. No.: 09/791,649

(22) Filed: Feb. 26, 2001

Related U.S. Application Data

(63) Continuation of application No. PCT/FR99/02030, filed on Aug. 24, 1999.

(30) Foreign Application Priority Data

Aug. 25, 1998 (FR) .............................. 98 10667

(51) Int. Cl.⁷ .............................. B60P 3/10; B63B 21/64; B63C 13/00
(52) U.S. Cl. ........................................ 114/344
(58) Field of Search ......................... 114/344

(56) References Cited

U.S. PATENT DOCUMENTS

| | | | | |
|---|---|---|---|---|
| 2,410,570 A | * | 11/1946 | Davis | 114/344 |
| 2,781,529 A | * | 2/1957 | Moody | 114/344 |
| 2,890,466 A | | 6/1959 | Bly | |
| 3,421,472 A | * | 1/1969 | Oberg | 114/344 |
| 3,618,149 A | | 11/1971 | Christensen | |
| 3,765,368 A | | 10/1973 | Asbeck | |
| 4,008,679 A | * | 2/1977 | Bozzano | 114/344 |

FOREIGN PATENT DOCUMENTS

| FR | 2 568 215 | 1/1986 |
|---|---|---|
| GB | 1 587 183 | 4/1981 |

* cited by examiner

*Primary Examiner*—S. Joseph Morano
*Assistant Examiner*—Andrew Wright
(74) *Attorney, Agent, or Firm*—James C. Lydon

(57) ABSTRACT

A craft transportable by road by being hitched at the rear of a vehicle, including two wheels capable of being extended from their housing into running position through an opening in the housing, each wheel being coupled by a shaft to one first end of a lever arm, the assembly being articulated on a shaft integral with the hull, and the second end of the lever arm being coupled by a shaft to a shock absorber fixed to a first support for maintaining the wheels in extended position. When the wheels are retracted IN the housing, a trap door integral with the lever arm is urged to come to a stop on a boss to close the housing opening after the shock absorber has been released and fixed upon a second support integral with the lever arm and after the lever arm has been fixed to a third support integral with the hull, so as to close the opening completely, thereby preventing water from penetrating into the housing where the wheel is located.

7 Claims, 3 Drawing Sheets

CRAFT TRANSPORTABLE BY ROAD

This application is a continuation of International application PCT/FR99/02030, filed Aug. 24, 1999 and published on Mar. 2, 2000 in the French Language.

TECHNICAL FIELD

The present invention relates to a craft which can be transported behind a vehicle by means of wheels which can be retracted when the craft is in the water.

BACKGROUND ART

Transportable crafts are increasingly widespread. Their users place them on trailers in order to transport them from their storage area to the water and back again. Said trailers feature relatively complex devices for handling the boat on the slip which is an inclined plane in the majority of ports.

There is a very large number of trailer types with a variety of more or less complicated handling devices. Almost all of these devices feature a winch and rollers to slide the boat into the water or to raise it onto the trailer. Some trailers feature an articulated chassis. Others are provided with a second trailer on top of the first, this second trailer being designed to enter the water, at which point the boat is completely released.

These various devices present numerous inconveniences, among which the complexity of handling, the mechanical complexity and all of failure risks it implies, the relatively long handling time which blocks the slip at the expense of other users, the high cost of a trailer in addition to the cost of the boat, and the size of a trailer which is difficult and costly to park near the port, in addition to the vehicle that pulls it.

In order to solve these inconveniences, boats have been designed with retractable wheels in the hull, as in the case of the craft described in FR-A-2.568.215. Each wheel is actuated by a specific lifting means which consists mainly of a lever arm, the end of which is directly secured to the axle of the wheel and the other end of which can be actuated directly and held in place by a locking means in either the retracted position or the running position.

In the craft described in FR-A-2.568.215, the housing in which the wheel is located is closed by a trap door to prevent water from entering the housing which would be considered a handicap when underway. The trap door is held in closed position by an elastic strap and is pushed back into open position when the wheel is out of its housing. Unfortunately, it turns out that this trap door presents a number of major disadvantages. When under way, the speed of the boat creates a suction force on the trap door which compensates the force of the elastic strap and causes the trap door to open, thus allowing water to penetrate into the housing. To solve this problem, it would obviously be possible to increase the tension of the return means, in this case the elastic strap. In this case, however, the significant tension force required to preclude the trap door from opening when under way, prevents it from being pushed open by the wheel when the craft is put in running position.

Another drawback of the trap door used in FR-A-2.568.215 is that the elastic strap is permanently stretched to its maximum when the craft is parked with the wheels extended, which eventually causes it to loose its efficiency.

Finally, when the craft is in running position, the trap door is in low position and thus very close to the ground, running the risk of impacts caused by bumps and other protruding elements on the running surface.

SUMMARY OF THE INVENTION

This is why the object of the invention is to provide a craft transportable by road, whose wheel housing trap door is integral with the wheel retraction mechanism and no longer subjected to an elastic return means.

The invention relates therefore to a craft transportable by road by being hitched at the rear of a vehicle, comprising two wheels capable of being extended from their housing into running position through an opening in the housing, each wheel being coupled by a shaft to one first end of a lever arm, the assembly being articulated on a shaft integral with the hull, and the second end of the lever arm being coupled by a shaft to a shock absorber fixed to a first support for maintaining the wheels in extended position. When the wheels are retracted in their housing, a trap door integral with the lever arm is urged to come to stop on a boss to close the housing opening after the shock absorber has been released and fixed on a second support integral with the lever arm and after the lever has been fixed to a third support integral with the hull, so as to close the opening completely, thereby preventing water from penetrating into the housing where the wheel is located.

BRIEF DESCRIPTION OF THE DRAWINGS

The objects and characteristics of the invention will become more apparent from the following description when taken in conjunction with the accompanying drawings in which.

DETAILED DESCRIPTION OF THE INVENTION

Figure 1:
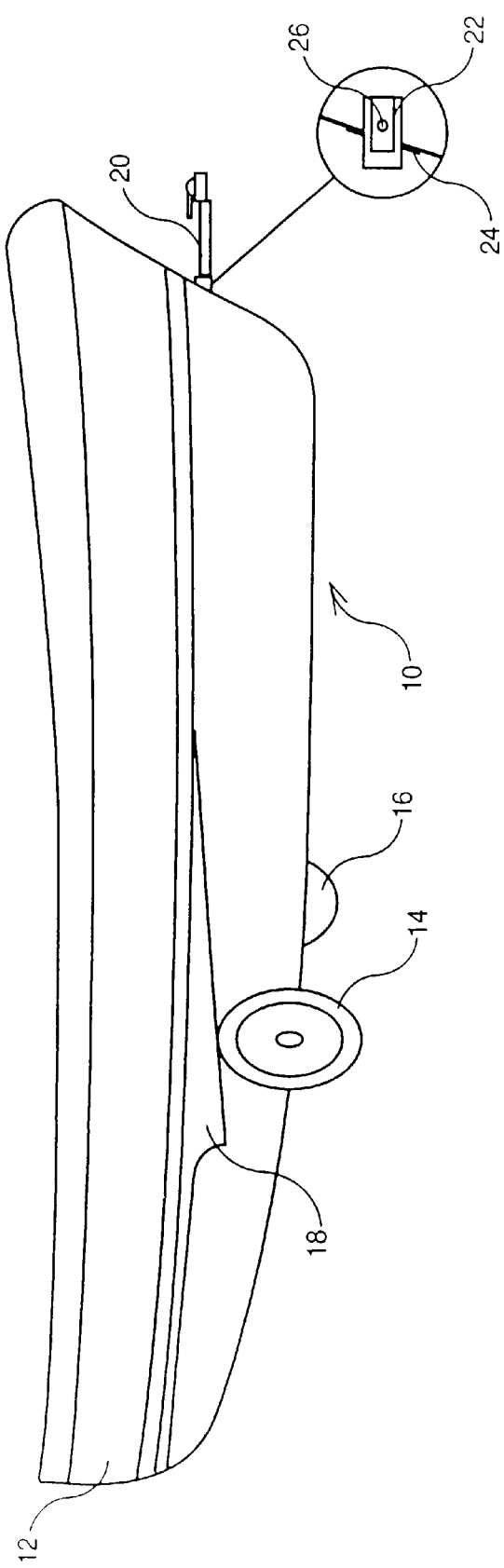
FIG. 1 is a perspective view of a transportable craft forming the object of the invention.

As shown in FIG. 1, the craft 10, in running position, includes a hull 12 carried by means of two wheels 14 and 16, which are retracted, when the craft is in the water, into housings 18 (or 18') which protrude slightly from the hull in the vertical direction. At the bow of the craft, a draw bar 20 allows the craft to be hitched behind a motorized vehicle. As illustrated in the circle, the draw bar 20 is removable and can be screwed and unscrewed in a metal part 22 having a blind tapped hole to prevent water from entering the craft. Reinforcement 24 is placed inside the hull at this location. In running position, a safety pin 26 is placed on the metal part 22 when the draw bar 20 is screwed into the metal part.

Figure 2:
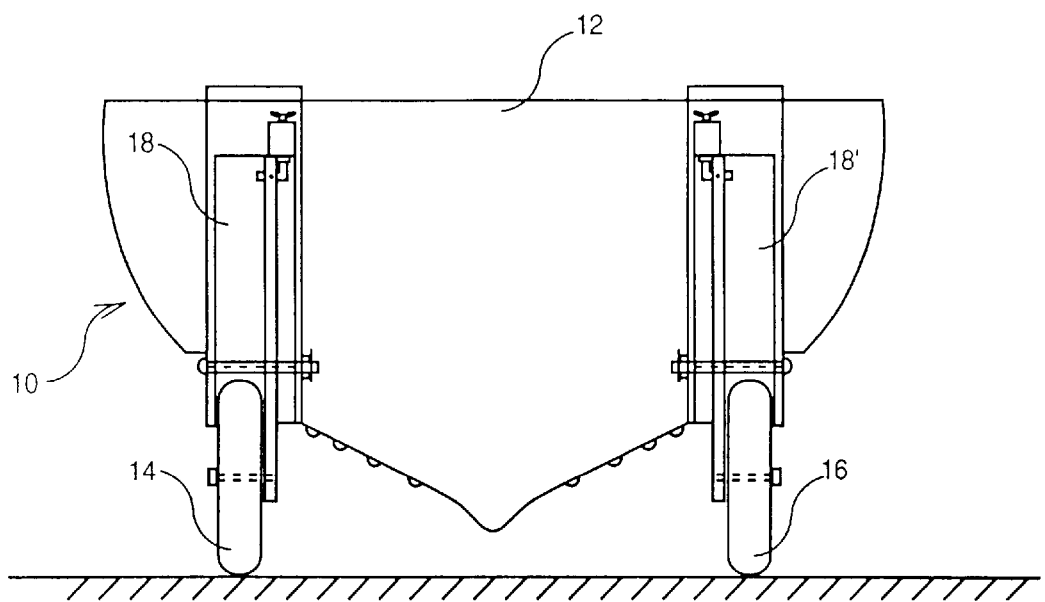
FIG. 2 is a cross-sectional view of the craft at wheel level, when the craft is in running position.
Figure 3:
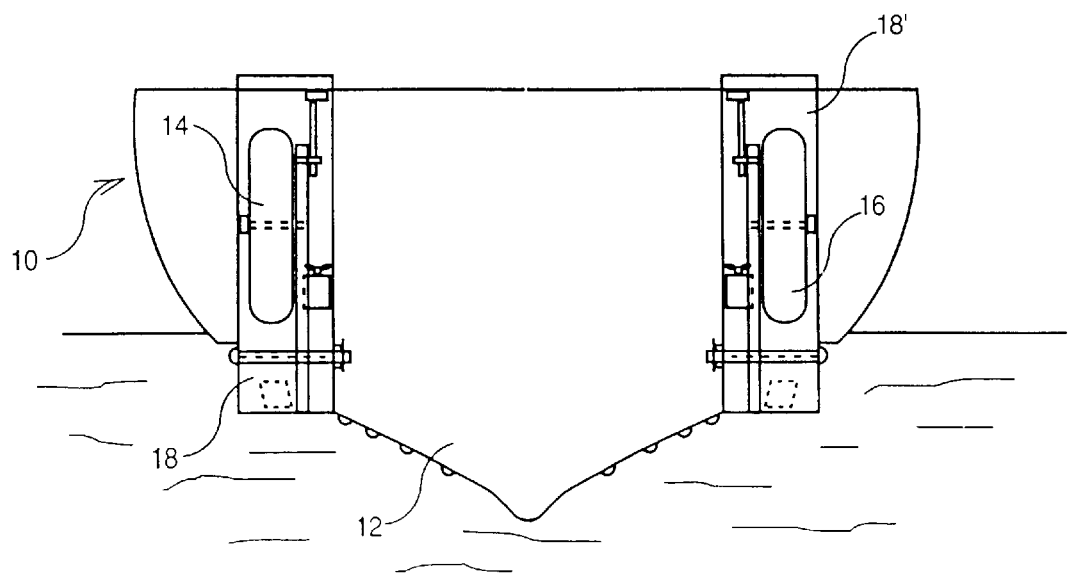
FIG. 3 is a cross-sectional view of the craft at wheel level, when the craft is in the "wheels retracted " position.

As shown in FIG. 2, the wheel 14 or 16 is completely extended from its housing 18 when the craft is in running position and ready to be transported by rolling on its wheels. On the other hand, when the craft is under way, the wheels 14 and 16 are retracted into their housing 18 by an advanced mechanism, described below.

Figure 4:
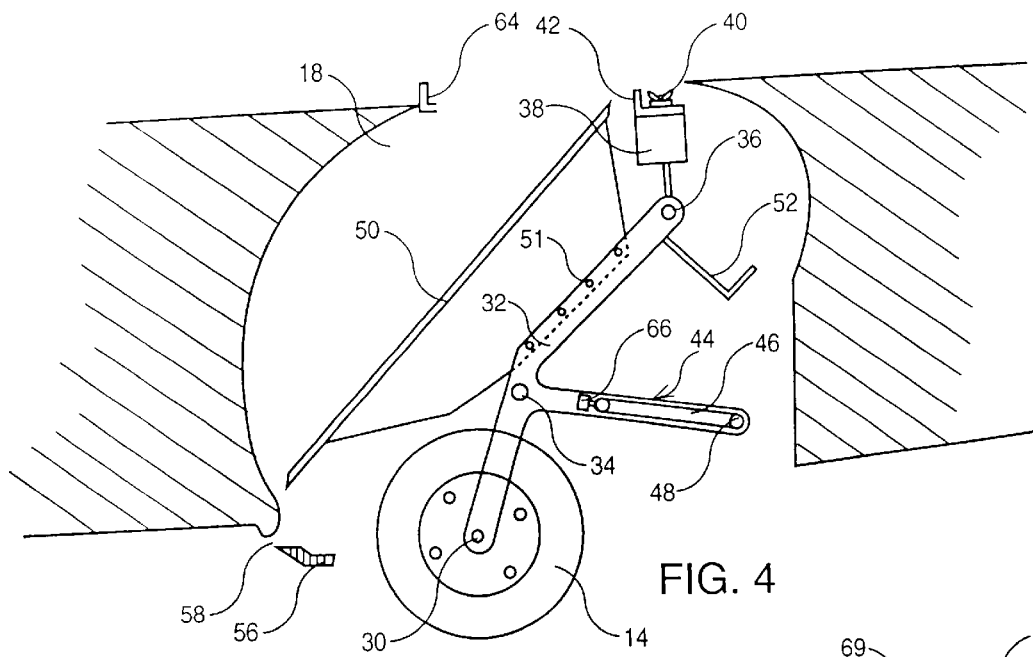
FIG. 4 is a longitudinal view showing the inside of the wheel housing and its mechanism, when the craft is in running position.

FIG. 4 shows the mechanism which allows the wheels to be held in position on the ground. The wheel 14 (or 16) is coupled by a shaft 30 to a first end of a lever arm 32, articulated on a shaft 34 integral with the hull 12. The second end of the lever arm 32 is coupled by a shaft 36 to a shock absorber 38 working in tension and which is itself secured by means of a butterfly nut 40 on a support 42 integral with the hull. This butterfly nut thereby enables the wheel to be held in running position when on the ground.

The secondary arm 44 of the lever arm 32, integral with the latter, has its end coupled to a connecting rod 46 by a shaft 48. When in running position, as shown in FIG. 4, the connecting rod and the secondary arm 44 are side by side.

Finally, a trap door 50 which makes up an essential characteristic of the invention, is integral with the lever arm 32 by means of screws or any other fastening means. As shown on the figure, the trap door 50 is located on the inside of the housing 18 (or 18') when the craft is in running position, preventing it from colliding with protrusions on the ground as was the case in the closest prior art implementation.

Figure 5:
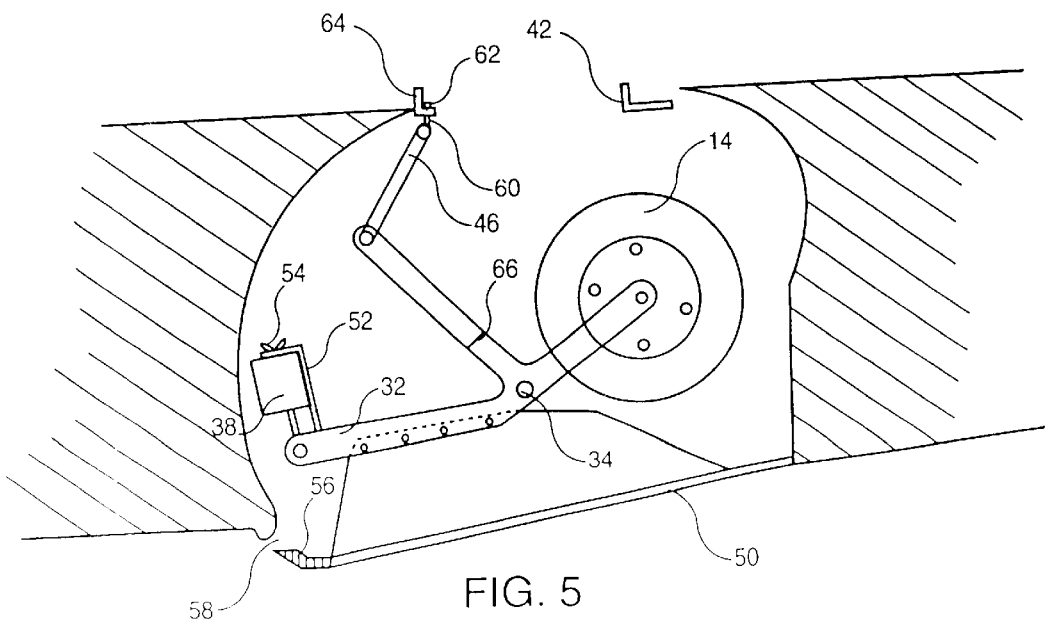
FIG. 5 is a longitudinal view showing the inside of the wheel housing and its mechanism when the craft is in the "wheels retracted " position.

To switch to the "wheels retracted" position shown in FIG. 5, the butterfly nut 40 is unscrewed from the support 42 and the shock absorber 38 is pivoted and secured to the support 52 which is integral with the lever arm 32 by means of a butterfly nut 54. The lever arm 32 is then pivoted around the shaft 34 until the trap door 50 stops on the boss 56. In this position, the trap door 50 completely closes the housing opening, leaving a minimum amount of play around the trap door which does not allow the water to penetrate into the housing. There is, however, an opening 58 at the rear of the each housing 18 (or 18') to drain the water when the craft begins to gain speed to avoid the presence of any water in the housing, even a small amount, that could increase the weight of the craft. It should also be noted that the inside wall of the housing is in the shaped of an arc in order to have a minimum amount of water in the housing when the craft is under way.

When the wheel 14 is in place in its housing 18 and when the trap door is against the boss 56, the connecting rod 46 is pivoted around the shaft 48 so that an end lug 60 can be secured by a butterfly nut 62 on a bracket 64 integral with the hull. It is conceivable that the end lug 60 can be secured to a lug 66 integral with the secondary arm 44 when the wheel is extended and the assembly in running position on the ground.

Figure 6:
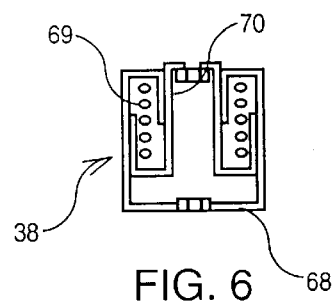
FIG. 6 is a sectional view of the shock absorber operating in tension mode.

According to an important characteristic of the invention, the shock absorber 38 shown in a cross-sectional view in FIG. 6, works in tension owing to the presence of a coil spring 69 placed between the parts 68 and 70 which are fitted together so that the spring is compressed when the part 70 is subjected to a tension in relation to part 68. This tension operation, when the craft is in running position on the ground, is very important inasmuch as it allows the shock absorber to stretch approximately 5 cm, that is ten times more than a standard shock mount.

What is claimed is:

1. A craft transportable by road by being hitched at the rear of a vehicle, said craft comprising
   a hull having two wheel housings,
   two wheels, each capable of being extended from its housing through an opening in the housing, each wheel being rotably mounted to a first end of a lever arm, each wheel and lever arm comprising an assembly,
   each lever arm being pivotably mounted on the hull, with a second end of said lever arm being coupled by a shaft to a shock absorber releasably fixed to a first support for maintaining the wheel in a first, extended position;
   wherein each said assembly is adapted to pivot about its mounting so as to move its wheel from said first, extended position to a second, retracted position within said housing; and
   wherein each said assembly also comprises a trap door, integral with said lever arm, that comes to stop on a boss of the hull when the wheel is retracted into said housing so as to close said opening completely thereby preventing water from penetrating into said housing where the wheel is located, and
   an opening in the hull located above each boss to allow water to drain when the craft is under way,
   wherein said shock absorber is releasably fixed on a second support integral with said lever arm, said second support being releasably fixed to a third support integral with the hull when said trap door comes to a stop on said boss.

2. The craft of claim 1, in which said lever arm features a secondary arm equipped with a connecting rod pivotably mounted at its first end to said secondary arm, the other end of said connecting rod being releasably fixed to said third support when said wheel is in said second, retracted position.

3. The craft of claim 1, wherein the arrangement of said lever arm and said shock absorber at the end of said lever arm allows said shock absorber to work in traction when the craft is rolling on the ground.

4. The craft of claim 3, in which said shock absorber includes two hollow parts fitted together and separated by a coil spring working in compression when said shock absorber is subjected to a tension force.

5. The craft of claim 1, wherein an inside wall of said housings is in the shape of an arc in order to have a minimum quantity of water in said housings when the craft is under way.

6. The craft of claim 1, wherein said trap door is fixed by screws or any other means, onto said lever arm.

7. The craft of claim 1, further comprising a part integral with the hull by means of reinforcement and having a tapped blind hole to be able to screw in a draw bar connected to a vehicle in running position.

* * * * *